No. 844,821. PATENTED FEB. 19, 1907.
A. H. MARKS.
SOLID RUBBER TIRE.
APPLICATION FILED APR. 30, 1906.

UNITED STATES PATENT OFFICE.

ARTHUR H. MARKS, OF AKRON, OHIO.

SOLID RUBBER TIRE.

No. 844,821.　　　　Specification of Letters Patent.　　　　Patented Feb. 19, 1907.

Application filed April 30, 1906. Serial No. 314,503.

*To all whom it may concern:*

Be it known that I, ARTHUR H. MARKS, a citizen of the United States, residing at Akron, in the county of Summit and State of Ohio, have invented certain new and useful Improvements in Solid Rubber Tires, of which the following is a specification.

This invention relates to improvements in solid rubber tires having a plurality of layers of metal fabric embedded in the base thereof; and the object is to produce a tire of this type in which the juncture between the two parts forming the same occurs within the zone of the metal fabric where it is subjected to less strain, thereby producing a stronger tire.

With the above object in view the invention consists in the novel features of construction hereinafter fully described, particularly pointed out in the claims, and clearly illustrated by the accompanying drawings, in which—

Figure 1:
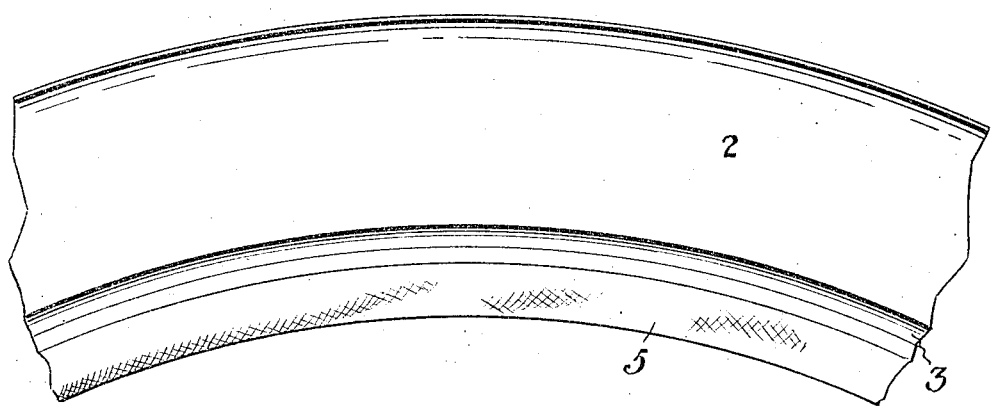
Figure 2:
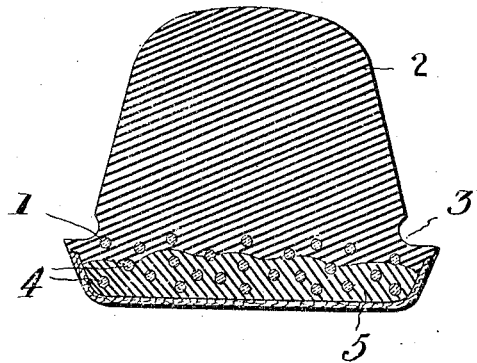

Figure 1 is a side elevation of a portion of a tire constructed in accordance with my invention, and Fig. 2 a transverse sectional view of the same.

In forming my tire I first place a single layer 1, of suitable metal fabric, in a straight mold and place upon the top of said fabric a suitable rubber compound. Pressure is then applied and the rubber compound forced through the interstices of the metal fabric. By this operation the tread 2 of the tire is formed and the upper portion 3 of the base. In another mold a plurality of layers 4 of the metal fabric are placed and rubber compound placed thereon. Pressure is then applied and the rubber compound forced into the interstices of the metal fabric. The lower portion 5 of the base of the tire is thus formed. The two parts 3 and 5 are then placed in a circular mold and joined, the ends united, and the whole vulcanized.

Heretofore difficulty has been experienced in securing proper adhesion between the tread and base portions of the tire, because the line of adhesion occurred at the least favorable point. In my improved tire the juncture of the two parts 3 and 5 is at a point below the first layer of metal fabric, where it is subjected to less strain, and consequently a stronger tire is produced.

It will thus be seen that I have provided a tire in which the juncture of the two parts 3 and 5 is at a point within the zone of the metal fabric—that is, between the upper and lower surfaces of said zone.

I have not claimed in the present application the improved method of producing the tire, the same forming the subject-matter of an application filed May 11, 1906, Serial No. 316,361.

Having thus fully described my invention, what I claim as new, and desire to secure by Letters Patent of the United States, is—

1. A rubber tire comprising a tread, and a base having embedded therein, a plurality of layers of reinforcing metal fabric or the like, said tire formed of two parts having the juncture thereof within the zone of the metal fabric.

2. A rubber tire comprising a tread, and a base having embedded therein a plurality of layers of reinforcing metal fabric or the like, said tire formed of two parts having the juncture thereof between the first layer and the remaining layers of the metal fabric.

3. A rubber tire comprising two parts and having a reinforcing metal fabric or the like embedded therein, the line of demarcation between the two parts being within the zone of the metal fabric.

4. A rubber tire of the type having a plurality of layers of metal fabric or the like embedded in the base characterized by being formed of two parts having the joint between the same within the zone of the metal fabric.

5. A rubber tire of the type having a plurality of layers of metal fabric or the like embedded in the base, formed of two parts having the joint between the same at a point below the first layer of metal fabric.

6. A rubber tire of the type having a plurality of layers of metal fabric or the like embedded in the base, characterized by having the tread and upper portion of the base formed as one part with one or more layers of the metal fabric embedded in said upper portion of the base, and the lower portion of the base forming the other part and having one or more layers of the metal fabric embedded therein, the two parts being firmly united to form an integral whole.

In testimony whereof I affix my signature in presence of two witnesses.

ARTHUR H. MARKS.

Witnesses:
　O. S. HART,
　F. J. J. HARRIS.